UNITED STATES PATENT OFFICE.

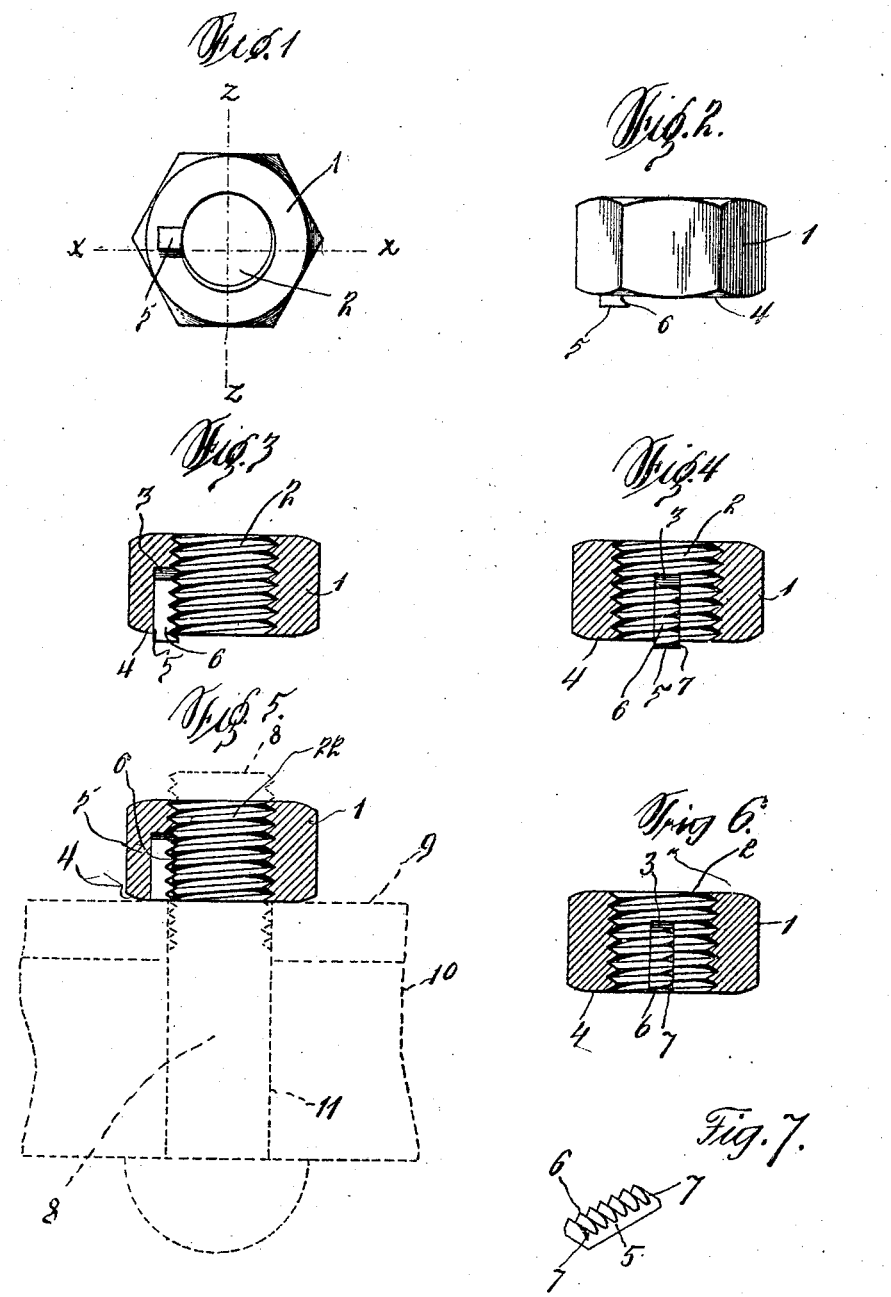

KOLOMAN NAGYVATHY AND BELA NAGYVATHY, OF JOHNSTOWN, PENNSYLVANIA.

NUT-LOCK.

941,804.

Specification of Letters Patent.

Patented Nov. 30, 1909.

Application filed July 27, 1909. Serial No. 509,907.

*To all whom it may concern:*

Be it known that we, KOLOMAN NAGYVATHY and BELA NAGYVATHY, subjects of the King of Hungary, residing at Johnstown, in the county of Cambria and State of Pennsylvania, have invented certain new and useful Improvements in Nut-Locks, of which the following is a specification, reference being had therein to the accompanying drawing.

This invention relates to nut locks, and the invention has for its objects, first, to provide a nut lock of a simple, durable and inexpensive construction; second, to furnish a nut with novel means for positively locking the same upon a bolt; and third, to provide a nut lock that can be advantageously used in connection with joints, bridges, rolling stock and structures subjected to vibrations.

We attain the above objects by a nut lock wherein the principle of manipulating the threads of a bolt is employed, without resorting to the use of resilient washers, pins, and such devices that cannot be used in connection with all types of bolts and nuts.

Our invention will be hereinafter considered in detail and then claimed, and reference will now be had to the drawing forming a part of this specification, wherein, Figure 1 is a front elevation of a nut constructed in accordance with our invention, Fig. 2 is a plan of the same, Fig. 3 is a horizontal sectional view taken on the line X—X of Fig. 1, Fig. 4 is a vertical sectional view taken on the line Z—Z of Fig. 1, Fig. 5 is a horizontal sectional view of a nut lock illustrating in dotted lines a bolt upon which the nut is located, Fig. 6 is a vertical sectional view of the nut lock showing the locking member in a closed position, and Fig. 7 is a perspective view of a detached locking member.

In the drawings, 1 denotes a nut of a hexagon design, but it is said in this connection that our lock is applicable to either a square or octagon nut having V-shaped threads. The threaded opening 2 of the nut has the wall thereof provided with a longitudinal groove 3 extending from the inner face of the nut to a point removed from the outer face thereof. The groove 3 is channel shaped or rectangular in cross section, and the upper edges of the groove intercept the threads of the opening 2.

Slidably mounted in the groove 3 is a rectangular locking member 5 of a less length than the groove 3, said member corresponding in cross sectional area to the groove 3 and having one side thereof provided with threads or teeth 6 adapted to register with the threads of the opening 2, when the member is correctly positioned, as best shown in Fig. 4 of the drawings. The teeth 6 are V-shaped in cross-section and are arranged transversely with respect to the body of the member 5 and each of the teeth at one end is inwardly beveled from its base to its apex, whereby the apex of the tooth will be of less length than the width of the member 5. The bevel of each of the teeth is indicated by the reference character 7. The length of the member 5 is of less length than the length of the groove 3.

In connection with the nut just described, we use an ordinary bolt 8, and in order that the manner of locking the nut 1 can be fully understood, we have illustrated by the way of example two plates or pieces of material 9 and 10 having alining openings 11 to receive the bolt 8. With the locking member 5 positioned in the groove 3, as shown in Figs. 3 and 4 of the drawings, the nut 1 can be screwed upon the bolt 8. The beveled or rounded-off ends of the threads or teeth 6 of the member 5 permit of the threads of the bolt 8 easily riding into engagement with the threads or teeth of the locking member. In rotating the nut 1 to the right, the threads of the bolt first encounter the beveled or rounded-off edges of the threads or teeth 6, consequently no abrupt edges are presented that would tend to interfere with the rotation of the nut upon the bolt.

It will be noted that the member 5 protrudes from the face of the nut 1, and as the nut is screwed upon the bolt, the outer end of the locking member is carried into engagement with the plate or piece of material 9. While the member 5 is prevented from moving farther with the nut 1, the nut can be still rotated a short distance, but the threads or teeth 6 of the member 5 will mutilate and cut into the threads of the bolt 8, upsetting the threads of the bolt sufficiently to positively retain the nut upon the bolt. In beveling and rounding-off the threads or teeth 6 at one edge of the member 5, sufficient space is provided for small particles or chips cut from the threads of the bolt 8. The nut 1 can be removed without destroying the threads of the bolt 8 or the threads of the opening 2 of said nut.

Having now described our invention what we claim as new, is:—

In a nut lock, the combination with a bolt, of a nut adapted to screw thereon and provided with V-shaped threads, said nut having the wall of its opening provided with a longitudinally extending rectangular groove of a length as to extend from the inner face of the nut to a point removed from the outer face thereof, the edges of the groove intercepting the threads of the nut, and a locking member substantially rectangular in cross-section shiftably mounted in the groove of the nut, and of a length less than the length of the groove, said locking member provided with transversely extending V-shaped teeth adapted to register with the threads of the nut, each of the teeth of said locking member being inwardly beveled at one end, the bevel extending from the base to the apex whereby the apex of each of the threads will be of less length than the width of said member, the sides of said member extending in parallelism with respect to the side walls of the groove and the beveled ends of the teeth providing means to allow of the nut to be easily screwed upon the bolt, said locking member when said nut lock is in operative position adapted to mutilate the threads of the bolt.

In testimony whereof we affix our signatures in the presence of two witnesses.

KOLOMAN NAGYVATHY.
BELA NAGYVATHY.

Witnesses:
ALEX COVER,
GEORGE MATTES.